Jan. 31, 1933.  P. BERTELL ET AL  1,895,566
REAR VIEW MIRROR ASSEMBLY
Filed Dec. 7, 1929
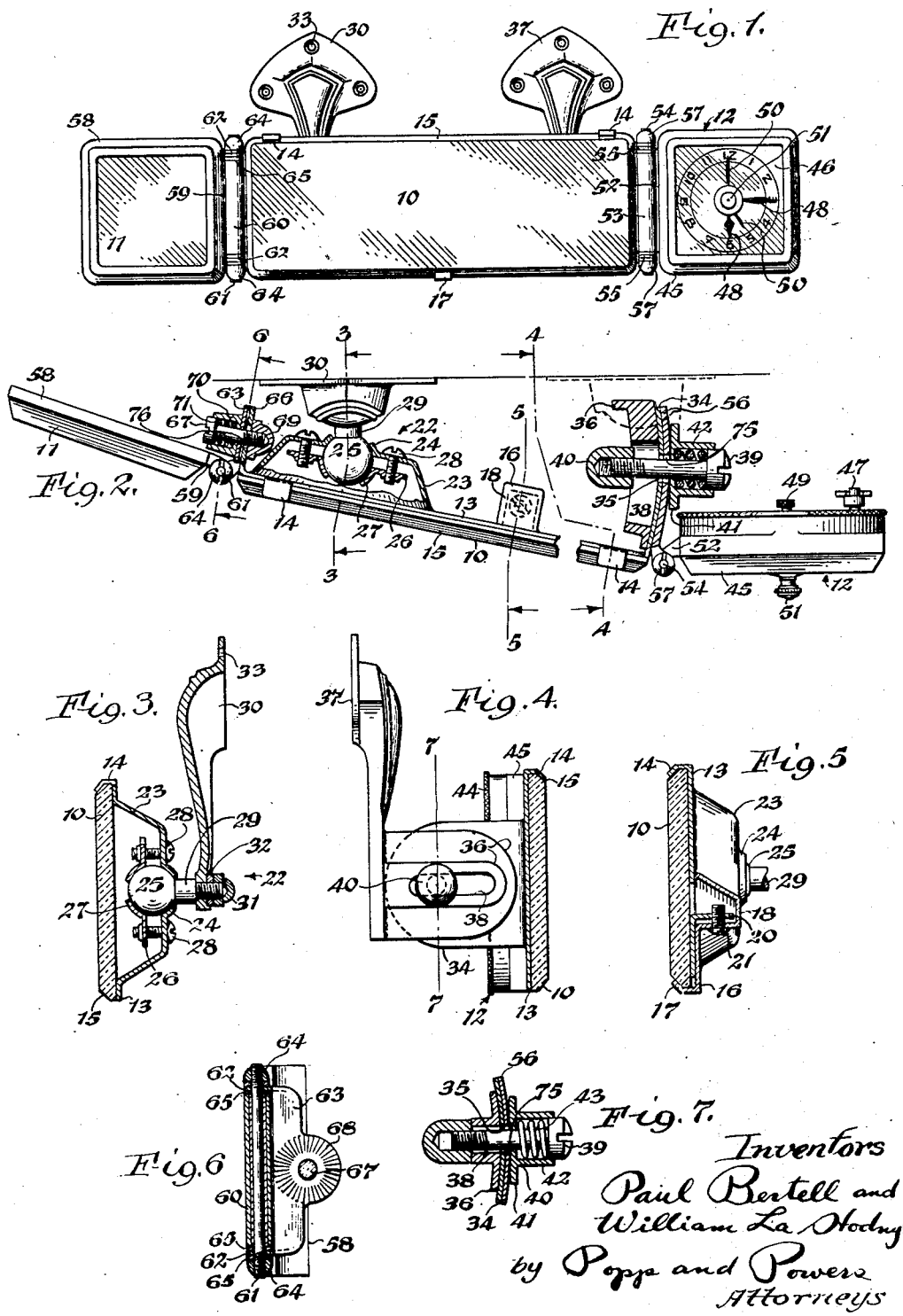
Inventors
Paul Bertell and
William La Hodny
by Popp and Powers
Attorneys Patented Jan. 31, 1933

1,895,566

UNITED STATES PATENT OFFICE

PAUL BERTELL AND WILLIAM LA HODNY, OF BUFFALO, NEW YORK, ASSIGNORS TO STANDARD MIRROR COMPANY, INC., OF BUFFALO, NEW YORK, A CORPORATION OF NEW YORK

REAR VIEW MIRROR ASSEMBLY

Application filed December 7, 1929. Serial No. 412,482.

This invention relates to a combined rear vision mirror and instrument for automobiles, airplanes, motor boats and other vehicles and is shown as embodied in a rear vision mirror having a watch or clock mounted at one side thereof and a side vision mirror mounted at the opposite side thereof, although any instruments can be substituted for the side vision mirror and the watch or clock, such as two side vision mirrors, an oil viscosity gage, a thermometer, a compass, a barometer or any other kind of instrument to which frequent reference is made.

This is a companion application to the application of James B. Weir for a combined rear vision mirror and instrument filed October 23, 1929, Ser. No. 401,946.

One of the principal objects of this invention is to provide a mounting for a comparatively heavy assembly of rear vision mirror and one or more instruments, in which the assembly is firmly and reliably held at two places, one of the supports comprising a ball and socket connection which carries the preponderance of the weight and the other comprising a universal support which steadies the assembly so supported and also permits the assembly to be moved laterally outward and also about a longitudinal axis so that the assembly can be moved into any desired adjusted position.

A further aim is to provide such an assembly which can be moved to any desired adjusted position by directly turning or moving the assembly as desired without the manipulation of thumb screws or any similar devices, the assembly being held in its adjusted position wholly by friction means.

A further aim is to provide a mounting for such an assembly which eliminates objectionable vibrations of the assembly in response to the vibration of the automobile, such vibration distorting the image reflected by the mirrors and also injuring the moving parts of the instruments, this stability in the mounting of the assembly being obtained by the combining of a ball and socket support and a separate frictional steady rest.

A further aim is to provide such an assembly which is relatively theft-proof and at the same time permits the instruments to be removed for the purposes of repair.

Another purpose is to provide an assembly which can be reversed for use on right hand drive cars and in which the different units can be interchanged to form various combinations, as desired.

Another purpose is to provide a mounting which permits an equal limited movement of the mirror horizontally in either direction from an angle of 12.5 degrees relative to the windshield. This angle has been found to be best suited for most cars and a limited movement from this angle will adapt the assembly for any car.

Another object is to provide a simple and positive means for holding the rear vision mirror in proper position on its supporting plate, which means have no tendency to dig into the coated backing of the mirror.

A still further purpose is to provide such an assembly which is balanced, attractive and compact in appearance both from the front side and also from the back as viewed through the windshield, and lends itself to attractive color schemes.

In the accompanying drawing:

Figure 1 is a front elevation of a combined rear vision mirror, side vision mirror and watch or clock mounted in accordance with our invention.

Figure 2 is a top plan view thereof showing parts of the same broken away to disclose the construction.

Figures 3–6 are vertical transverse sections taken on the correspondingly numbered lines in Fig. 2.

Figure 7 is a section taken on line 7—7, Fig. 4.

Similar characters of reference indicate like parts in the several figures of the drawing:

In its general organization this invention comprises a rear vision mirror which is supported at one end by a ball and socket joint having friction means resisting the movement of the mirror and at its other end the mirror is supported by a slot and bolt steadying rest which permits the movement of said mirror about its longitudinal axis, also movement of the mirror toward and from the head bar of the automobile windshield and also leveling movement of the rear vision mirror, side vision mirror and other instrument or instruments to level the same. This steadying rest also embodies a spring loaded presser member which frictionally resists the movement of the slot and bolt connection and is so designed as to permit an 8 degree movement in either direction from a normal 12.5 degree longitudinal angularity of the rear view mirror relative to the head bar of the windshield. The invention also comprehends the embodiment of a specific form of device for clamping the mirror to its supporting plate and also a specific frictional pivotal connection between the mirror and its support, or an instrument such as a side vision mirror, or a watch or clock which may be supported adjacent the mirror. The invention is, however, capable of wide application and modification and the form shown is purely an example of one method of practicing the same.

The assembly is shown as adapted for mounting on the head bar of a windshield and consists of a central, comparatively wide rear vision mirror 10, a left side vision mirror 11 arranged at the left side of the rear vision mirror 10 and arranged to command a view of cars passing the vehicle on that side, and a watch or clock 12 mounted at the opposite side of the mirror. It is apparent, however, that any instruments can be substituted for either the side vision mirror 11 or the watch or clock 12, such as a barometer, a thermometer, an oil or gasoline gage, a compass or the like.

The rear vision mirror 10 can be of any suitable form or shape and can either be made of the silvered type or in the form of a colored non-glare mirror, such mirrors having suitable coatings or the like which absorb the greater part of the light thrown upon them and thereby reflect the image with reduced illumination without, however, distorting the image.

This rear vision mirror is carried by a metal back plate or holder which, as best shown in Figs. 2–5, consists of a flat metal plate 13 which extends substantially the full extent of the rear vision mirror 10 and is formed at its upper edge to provide outwardly projecting fingers or lips 14, these fingers engaging around the beveled edge 15 of the upper side of the mirror 10 and serving to hold that edge of the mirror.

To grasp the lower edge of the mirror 10 and also to force the mirror 10 into firm engagement with these fingers 14, a clamping member 16 is provided. This clamping member consists of a sheet metal plate which lies against the back of the metal mirror holder 13, as best shown in Fig. 5, and at its lower end is formed to provide an upturned finger 17 which engages the lower beveled edge of the mirror 10, as shown in Fig. 1. The upper end of this clamping member 16 is formed to provide a cup-shaped part 18 which has vertical parallel walls 19.

The open side of this cup-shaped part 18 opens against the metal mirror holder 13 and the mirror holder or plate at this place has a tongue 20 punched rearwardly therefrom and arranged in the cup-shaped part 18. This tongue is provided with a threaded opening which receives a screw 21, this screw extending through an opening provided in the bottom of the cup-shaped part 18 of the clamping member 16. In assembling this structure, the mirror plate 10 is first caught under the upper fingers 14 and the clamping member 16 is placed so that its finger 17 engages the bevel of the mirror 10 and its cup-shaped part 18 arranged over the tongue 20 of the mirror holder 13. The screw 21 is then inserted in the opening in the cup-shaped part 18 and upon being turned finds the threads in the tongue 20 and draws the clamping member 16 upwardly and thereby securely clamps the mirror 10 between the finger 17 and the fingers 14. This clamping member is quickly and readily applied, forms a reliable means for securing the mirror 10 to its plate and at the same time is neat in appearance both from the front and the back side of the mirror. It will also be noted that there is no tendency for the clamping member 16 to dig into the coating of the rear vision mirror 10 upon being tightened since it is arranged against the plate 13 instead of this coating. This is an objection to a number of commercial devices designed for this purpose.

The rear vision mirror and its associated instruments 11 and 12 are primarily supported by a ball and socket joint indicated generally at 22. This ball and socket connection can be of any suitable construction and as best shown in Figs. 2 and 3 the sheet metal mirror holder 13 is formed to provide a rearwardly projecting cup-shaped part 23 which is provided centrally with an opening. Around this opening the cup-shaped part 23 is formed to provide a spherical socket 24. In this socket is fitted a ball 25, this ball 25 being held in this socket 24 by a clamping plate 26 also having a spherical socket 27 which receives the ball 25. The ball 25 is clamped between the sockets 24 and 27 by bolts 28 which draw the clamping plate 26 toward the rear wall of the cup-shaped part 23. The sheet metal walls forming the cup-shaped part 23 and the clamping plate 26 are sufficiently yielding so that the ball 25, while firmly held, can be manually moved about upon the application of manual pressure.

The ball 25 is provided with a stem 29 which projects rearwardly and is provided with a reduced threaded rear end. This reduced threaded rear end, as best shown in Fig.

3, extends through an opening provided in the lower end of a bracket arm 30, and is secured thereto by a cap nut 31. A lock washer 32 is preferably interposed between the cap nut 31 and the bracket arm. The upper end of the bracket arm can be made in any desired artistic configuration, and is shown as provided with screw holes 33 which permit it to be attached to the head bar of the windshield of an automobide or other suitable part.

This ball and socket support for the rear vision mirror rigidly supports the mirror against vibration and accidental displacement and at the same time permits the mirror to be turned to any desired position. At the same time the parts are substantially concealed so that the assembly as a whole presents a neat and finished appearance when viewed through the windshield of an automobile.

The ball and socket support is arranged at one end of the rear vision mirror and the opposite end of the rear view mirror is supported by a steadying rest which permits the required transverse and axial movement of the rear vision mirror and also a leveling movement thereof and is preferably constructed as follows:

At this end the sheet metal supporting plate 13 for the mirror 10 is formed to provide a rearwardly extending relatively long arm 34 which, as best shown in Figs. 2 and 7, is dished outwardly concentrically with the vertical axis of the ball 25 so as to form a spherical socket. This arm 34 is provided with a hole 35 and bears against the outer face of a similarly dished arm 36. This arm 36 is formed integrally with a bracket arm 37 which bracket arm is of the same configuration and secured to the windshield head bar in the same manner as the bracket arm 30.

The dished arm 36 at the lower end of the bracket arm 37 is provided with a horizontal slot 38 which is adapted to receive the shank of a bolt or pin 39. This bolt, as best shown in Fig. 2, is provided with a head and extends through the hole 35 in the curved sheet metal arm 34 and through the slot 38, and at its inner threaded end carries a cylindrical threaded head or nut 40. Slidingly mounted on the fixed head of the bolt 39 is a presser shoe or follower 41 which is provided with a cylindrical part 42 receiving the fixed head of the bolt 39 and a rounded shoe which presses inwardly toward the outer face of the curved arm 34 and is provided with an opening through which the shank of the pivot bolt 39 extends. This follower or presser shoe 41 is urged toward the arm 34 by a helical compression spring 43 which is concealed within the follower 41 and is interposed between the fixed head of the bolt 39 and the follower 42 so as to urge the follower inwardly and draw the bolt 39 and its removable head 40 outwardly, as best shown in Fig. 2. This compression of the bolt 39 frictionally holds the dished arm 34 of the mirror holder 13 firmly against its dished supporting arm 36 and forms a vibrationless rest at that end of the rear view mirror. At the same time that end of the rear view mirror can be moved manually outward, with the ball 25 serving as an axis and the bolt 39 riding along the slot 38 against the frictional resistance of the presser shoe 41.

The sheet metal arm can also be turned around the bolt 39 as an axis so that the rear vision mirror can be adjusted to any desired angularity about this axis. It is therefore apparent that by the combination of the ball and socket support at one end of the rear vision mirror and the spring seat at the opposite end, a firm and reliable mounting is provided for the rear vision mirror, and at the same time the mirror can be moved to any desired position without the manipulation of any thumb screws, wing nuts or the like.

The hole 35 in the long arm 34 is made substantially larger than the shank of the bolt 39, and the width of the slot 38 in the fixed arm 36 is also substantially wider than the diameter of the shank of the bolt 39. This is for the purpose of permitting the leveling of the rear vision mirror 10 after the bolt 39 has been moved along the slot 38 and the mirror turned to the desired angle about the bolt 39 and ball 25 as pivots. After such adjustment, if the rear vision mirror is not square with the rear window of the car, the over size of the hole 35 and the excess width of the slot 38 permits the right hand end of the rear vision mirror to be raised or lowered as may be required to level the mirror and square it up with the rear window of the car.

It has been found that in most cars the proper longitudinal angle of the rear vision mirror 10 is approximately 12.5 degrees, and that from this angle the desired angularity does not vary more than 8 degrees. The present rear vision mirror mounting is therefore so designed that when the rear vision mirror is at a 12.5 degree longitudinal angle to the windshield, the pivot bolt 39 is at the center of the slot 38, and that in moving the bolt 39 from the center of the slot to either extremity, the angularity of the mirror is altered 8 degrees, the mirror thereby having a range of movement of 16 degrees. By this means the mirror is adapted to all makes of cars without requiring the provision of excessive limits of adjustment for the mirror. The mirror assembly can also be supplied to the automobile manufacturer set at 12.5 degrees and little adjustment is necessary to bring it to the correct angle.

The clock or watch 12 is shown as supported at the right of the rear vision mirror 10. This watch or clock can be of any usual or well-known construction and is shown as contained in a casing composed of a back 44, a bezel 45 and a crystal 46. The clock or watch is shown as wound by a key 47 at its back and its hands 48 are set by the usual knurled setting piece 49. In addition the crystal 46 can carry an elapsed time indicator consisting of hands 50 which are carried by the crystal and a knob 51 by which these hands are set over the regular hands of the watch or clock so that the time taken for a trip can be definitely ascertained.

The bezel is extended outwardly at one side to form the leaf 52 of a hinge, the knuckle 53 of this leaf extending around a pintle 54. The knuckles 55 of the other hinge leaf 56 are arranged at opposite ends of the knuckle 53 and this knuckle 53 is held frictionally in place by the compression of the nuts 57 at the ends of the pintle 54, with or without friction washers.

This hinge permits the watch or clock to turn in a horizontal plane and to permit its movement in a vertical plane. The other hinge leaf 56 lies against the outside of the rearwardly projecting long arm 34 of the mirror holder 13 and is provided with an opening 75 through which the pin or bolt 39 extends, as best shown in Fig. 2. It is therefore apparent that to swing the watch or clock 10 up or down the watch or clock casing is grasped and the hinge leaf 56 moved about the bolt 39 until the desired adjustment is obtained. The bolt 39 being spring loaded holds it thereafter in this adjusted position until manually readjusted.

To adjust the position of the watch or clock 10 in a vertical plane it is only necessary to grasp the casing and swing it about the pintle 54 to the desired position. It will therefore be observed that the watch or clock is provided with a universal mounting and can be swung in any desired position. It can therefore be easily rewound by reversing its position, it can be swung down to be illuminated by the dash light and it can be moved to either face the driver or the passengers as may be desired. It can also be readily and completely removed for repairs by either removing the pintle 54 or by removing the bolt 39.

The hole 75 in the hinge leaf 56 is made substantially larger than the shank of the bolt 39 which it receives. This is for the purpose of leveling the watch or clock up into a horizontal position. Thus if the right hand end of the mirror 10 is swung out and the watch or clock 12 tilted down, the upper right hand corner of the watch or clock 12 will be depressed, i. e. the upper edge of the watch or clock will not be horizontal. To level the watch or clock 12 it is manually moved up, the size of the hole 75 permitting this movement of the watch or clock 12 and its hinge upwardly relative to the bolt 39.

It is apparent that the construction is capable of various modifications, such as forming the hinge leaf 52 integrally or secured to the back 44 of the watch or clock instead of the bezel 45 as illustrated.

The side vision mirror or other instrument 11 at the opposite end of the rear vision mirror 10 is preferably enclosed in a casing 58 which is formed to provide the leaf 59 and knuckle 60 of a hinge, this knuckle being mounted on a pintle 61, the form and arrangement of this hinge being the same as that supporting the clock. The knuckle 62 of the other leaf 63 are held to the pintle 61 by nuts 64 and washers 65 in the same manner as the opposite hinge and the leaf 63 is arranged alongside a comparatively short arm 66 which extends rearwardly from the edge of the metal mirror holder. This leaf 63 and the short arms 66 are held together by a spring loaded bolt 67 about which the leaf 63 pivots and to increase the friction between this hinge leaf 63 and the arm 66, the opposing faces of both are preferably provided with radial corrugations as indicated at 68 or frictional composition washers (not shown) can be interposed. The bolt 67 is provided with a cap nut 69 and its head slidingly fits into a presser shoe 70. This shoe houses a helical compression spring 71 which surrounds the bolt 67 and is interposed between the head of the bolt and the bottom of the presser shoe 70 so that it urges the bolt 67 outwardly and the presser shoe 70 inwardly and compresses the hinge leaf 63 and the short arm 66.

The hole 76 in the arm 66 which hole 76 receives the shank of the bolt 67 is also made oversize. i. e. greater than the diameter of the shank of the bolt 67 to permit of leveling the side vision mirror 11 after it has been adjusted, this action being the same as that described with reference to the watch or clock 12.

It is therefore apparent that the side vision mirror 11 can be moved to any desired position since it pivots both around the vertical pintle 61 and the horizontal bolt 67 and since both are friction joints, it holds its adjusted position and is not subject to objectionable vibration.

In order to provide more friction between the arms 36, 34, and 56, should this be desired, they can be corrugated at their opposing faces, or fiber washers (not shown) can be arranged between these arms to provide the necessary friction.

As a whole this invention provides a rear vision mirror in which the mounting is so designed as to support comparatively heavy instruments as well as the rear vision mirror itself and in which all are free from objectionable vibration and at the same time the rear vision mirror can be easily moved to any desired angular position. The rear vision mirror is also reliably clamped to its supporting plate by a compact clamp which is substantially concealed, and the friction joints provided for the rear vision mirror and its associated instruments also have their working parts concealed and are of such construction as to function reliably for a long time without getting out of order. The assembly as a whole is also compact and attractive, and contains no unsightly mechanical parts either when viewed from the front of the assembly or through the windshield of the automobile.

We claim as our invention:

1. A device of the character described, comprising a relatively heavy rear vision mirror assembly, a support at one end of said mirror, a universal connection between that end of said mirror and said support, a second support at the opposite end of said mirror, a slot and bolt connection between the opposite end of said mirror and said second support and a presser member and a spring carried by said bolt and providing friction means resisting the movement of said slot and bolt connection but permitting the direct manual movement of said mirror.

2. A device of the character described, comprising a relatively heavy rear vision mirror assembly, a support at one end of said mirror, a universal connection between that end of said mirror and said support, a second support at the opposite end of said mirror, an arm projecting forwardly from said support, an arm projecting rearwardly from said mirror and arranged alongside said first arm, one of said arms being provided with a horizontal slot, a bolt extending through the other arm and riding in said slot whereby said mirror can be moved around its longitudinal axis and also moved toward and from said second support and spring friction means resisting the relative movement of said arms, comprising a head on said bolt, a presser member surrounding said bolt and directly and frictionally engaging the adjacent arm, and a helical compression spring surrounding said bolt and interposed between said head and said presser member whereby said presser member is frictionally urged against said last named arm.

3. A device of the character described, comprising a relatively heavy rear vision mirror assembly, a support at one end of said mirror, a universal connection between that end of said mirror and said support, a second support at the opposite end of said mirror, an arm projecting forwardly from said support, an arm projecting rearwardly from said mirror and arranged alongside said first arm, one of said arms being provided with a horizontal slot, a bolt carried by the other arm and riding in said slot whereby said mirror can be moved around its longitudinal axis and also moved toward and from said second support and spring friction means resisting the relative movement of said arms, comprising a head on said bolt, a cylindrical presser member fitted around said head and having a shoe which slidingly receives the shank of said bolt and bears against the adjacent side of the adjacent arm and a helical compression spring arranged in said presser member and surrounding the shank of said bolt and interposed between said head and said shoe whereby said shoe is urged toward said last named arm.

4. A device of the character described, comprising a rear vision mirror, a universal support at one end of said mirror, a supporting arm at the opposite end of said mirror, an arm projecting rearwardly from said mirror and engaging the side of said supporting arm, one of said arms being provided with a horizontal slot and a horizontal bolt extending through the other arm and riding in said slot, said slot being substantially wider than said bolt whereby the mirror can be leveled by moving said bolt vertically relative to said slot.

5. A device of the character described, comprising a rear vision mirror, a universal support at one end of said mirror, a supporting arm at the opposite end of said mirror an arm projecting rearwardly from said mirror and engaging the side of said supporting arm, one of said arms being provided with a horizontal slot, and the other being provided with a hole registering with said slot and a horizontal bolt extending through said hole and slot, said hole being substantially larger than said bolt whereby the mirror can be leveled by moving said bolt vertically relatively to said hole.

6. A device of the character described, comprising a rear vision mirror, a pivotal universal joint supporting one end of said mirror, the axes of movement in any direction of said mirror extending through the pivotal point of said joint, a second support at the opposite end of said mirror, and a slot and bolt connection between said mirror and said second support, said slot being horizontally disposed and permitting a substantial horizontal movement of said mirror and at least one of the openings forming part of said slot and bolt connection being sufficiently large in a vertical direction to permit the mirror to be leveled by moving the bolt vertically in said opening.

In testimony whereof we hereby affix our signatures.

PAUL BERTELL.
WILLIAM LA HODNY.